(12) United States Patent
Kwan

(10) Patent No.: US 8,001,035 B2
(45) Date of Patent: Aug. 16, 2011

(54) SYSTEM AND METHOD FOR CONDUCTING AN ELECTRONIC FINANCIAL ASSET DEPOSIT AUCTION OVER COMPUTER NETWORK

(76) Inventor: Khai Hee Kwan, Sandakan (MY)

( * ) Notice: Subject to any disclaimer, the term of this patent is extended or adjusted under 35 U.S.C. 154(b) by 2053 days.

(21) Appl. No.: 10/614,919

(22) Filed: Jul. 3, 2003

(65) Prior Publication Data

US 2004/0006531 A1  Jan. 8, 2004

Related U.S. Application Data

(63) Continuation-in-part of application No. 09/534,233, filed on Mar. 24, 2000, now Pat. No. 7,376,612.

(51) Int. Cl.
*G06Q 40/00* (2006.01)
(52) U.S. Cl. .................. 705/37; 705/35; 705/36 R
(58) Field of Classification Search ............. 705/35–38
See application file for complete search history.

(56) References Cited

U.S. PATENT DOCUMENTS

| | | | | |
|---|---|---|---|---|
| 5,613,679 A | * | 3/1997 | Casa et al. | 273/138.1 |
| 6,363,365 B1 | * | 3/2002 | Kou | 705/64 |
| 7,092,904 B1 | * | 8/2006 | Understein | 705/37 |
| 2001/0054001 A1 | * | 12/2001 | Robinson | 705/14 |

OTHER PUBLICATIONS

PNC Bank to Hold CD Auctions Through Jan. 2000, PR Newswire. New York: Nov. 4, 1999. p. 1.*

* cited by examiner

*Primary Examiner* — Hani Kazimi
*Assistant Examiner* — Clement B Graham

(57) ABSTRACT

A trusted computer system for conducting an electronic financial asset deposit auction over a computer network such as the Internet wherein invited depositor members are anonymous and bid against themselves for a number of sessions no greater than the number of depositor members. At each session, a member is declared a winner and eliminated from further sessions. The winner then collects the pooled discount deposits with repayment due in the next session payable to the winner of the said session. The aforesaid steps are repeated until one depositor is left wherein said depositor will receive the highest rate of return.

20 Claims, 5 Drawing Sheets

|  |  |  |
|---|---|---|
| Your Comments<br><br>I prefer return within the range of 10-15 % on principal. I prefer an ALL women group particularly within the legal fraternity. | Gender   Female<br>Handle   Cute Girl<br><br>Name   My Name<br>Average DEP   100,000.00<br><br>Address   1 ROME Ave, Kensington, NY, NY<br><br>Email   222@eeee.com<br>Occupation   Lawyer | |
| Initiator : YES | Invited Others: abc@eee.com, abs@ee.com, sjjd@ee.com etc | |
| Member : NIL | ○ Personality Test (IQ & EQ)<br>● No Screening Tests (default) | |
| Invited By: NIL | | |
| Password    Link Not Active<br>Bank Account/ Credit Card Number | SUBMIT<br><br>CANCEL | |

42 — Your Comments
40 — Profile info
41 — Invited Others
43 — Screening Tests
44 — Password/Bank

FIG 2

CUTE GIRL. You are a Member/Initiator of Network WomenLawyer since 1 Jan 2000.

| Delete Member | | Invite New Member |

Your Current Members are as follows :

XXX@gbds.com       No network
Shgjg@uiuo.com     No network
Gjkhkhk@cc.com     Click here to see other network this member belongs to.

You have 1 current deposit auction in progress code xxx278974. The term of deposit is 3 years. The current winner is XXX@gbds.com. The winning Bid is 14000. You have deposited 86,000 to this member. The next auction session is on the 1 Jan 2005. Two more sessions are in waiting. Your cashflow as below

| Sess 1 | Winner | XXX@gbds.com | Payout -86000 | Payin 50 |  Cash Flow |
| Sess 2 | Pending 1 Jan 2005. |
| Sess 3 | Pending 1 Jan 2006 |
| Sess 4 | Close  1 Jan 2007 |

| Terminate Auction | CLOSE WINDOW | Modify Auction |

FIG 3

SYSTEM AND METHOD FOR CONDUCTING AN ELECTRONIC FINANCIAL ASSET DEPOSIT AUCTION OVER COMPUTER NETWORK

CROSS-REFERENCE TO RELATED APPLICATIONS

This is a continuation in part (CIP) from application Ser. No 09/534,233 filed Mar. 24, 2000 now U.S. Pat. No. 7,376,612.

STATEMENT REGARDING FEDERAL SPONSORED RESEARCH OR DEVELOPMENT

Not Applicable

REFERENCE TO A MICROFICHE APPENDIX

Not Applicable

FIELD OF THE INVENTION

The present invention relates to system and method for conducting an electronic financial asset deposit auction such that a prospective depositor may receive among financial bids the most favourable terms and return potential. More particularly, the present invention relates to conducting an electronic financial asset deposit auction over a computer network such as the Internet and where the depositors are anonymous. Moreover, said depositors are electronically networked together by a trusted initiator who will invite the depositors and can vouch for their integrity or where membership is based on similar financial groupings, social or intellectual standing wherein personality test may be used in screening members. Depositors within said trusted network may then initiated a private deposit auction amongst themselves with each depositor having only one opportunity to win at each bidding session. The winner of each auction will be reassigned as the borrower and eliminated from further sessions until only one depositor is left. The last depositor standing will usually receive the highest return. This means at the outset of the auction, the borrower is unknown and is only determined by competitive bidding. This claimed invention is designed for person to person or peer to peer depositor auction system wherein said person is within a trusted network. However, companies to companies having authorised personnel may act on behalf of the company whereby similarly bid competitively to be the borrower at each session. The last company at the end of all auction sessions will receive the highest return. A trusted network in this claimed invention means a network of one peers including peer to peer computers or within a social grouping or amongst friends or are invited to join or socially selected by said initiator.

BACKGROUND OF THE INVENTION

Traditionally a person in need to find the highest return for his financial asset such as cash or shares or financial equivalent will be faced with a number of difficult choices such as the deposit institution not being insured or with further mergers limited choices amongst said institutions. Deposit institutions also faces many regulatory requirements which may not be suitable to some depositors who wish to maintain a high degree of privacy. In particular when huge amount of deposit are introduced, the deposit institution has to verify the source of said funding deposits. What is required here is a way for depositors to seek a better return within a trusted environment outside of the formal deposit taking institutional circle. The claimed invention provides an electronic network established by an initiator who has the trust of the anonymous members invited by initiator of the trusted network using peer to peer network in order to offer competitive rates. Usually members include social groupings, clan or professional groups of certain standing within the network whereby membership is by invitation.

There is currently no private, peer to peer or trusted networks where members are anonymous to each other conducting deposit auctioning amongst themselves where the borrower is unknown at the outset and said borrower is only determined competitively. Said network is defined as a network which is accessible by invitation only from a commonly known initiator. That is while the members are anonymous to each other, they nevertheless have a common initiator who invited them or from a member within the group. In the preferred embodiment character test such as Intelligent Quotient 'IQ' or Emotional Quotient 'EQ' tests may be used to as a pre-screener to determine character similarly found in employment art.

Furthermore, there may exist many other private networks and in order to link one network to another network there must be a common member known to each other from one of the initiating network. Once a member is identified then he or she can be an initiator to combine two or more networks together in a competitive deposit auction. Preferably the initiator is provided a fee for such a service. Preferably the host providing this system is also provided a fee for providing the facility system.

PRIOR ARTS

Zandi was issued a patent for his "System and Method for Conducting Loan Auction Over a Computer Network." This computer system was for conducting an electronic loan auction over a computer network such as the internet. The computer system included a computer connected to the internet which performed the following functions: (1) receiving an electronic loan application form from a prospective borrower; (2) providing such application to a loan authorizer's computer over the computer network for approval; (3) receiving an electronic message from the loan authorizer's computer indicating whether or not such loan has been approved; (4) entering the loan application into a database that is accessible to lenders via the computer network, if the loan is approved; and (5) maintaining the loan application in the database for a predetermined period of time during which lenders submit bids and the borrower may accept a bid We distinguished Zandi in our claimed invention as our subject matter relates to depositors and deposit wherein deposits includes cash and cash equivalent which are being bided amongst members anonymously within a private network. The nature of a deposit and a loan is well known in the art which has distinguished each other in the case of VideoTrax, Inc. v. NationsBank, N.A., 33 F.Supp.2d 1041 (S.D. Fla. 1998), affd 205 F.3d 1358 (11th Cir.2000), cert. den. 1212 S. Ct. 66 (Oct. 2, 2000). Secondly, Zandi's teachings require that loan applicant's identity be known to the bidders. As one skilled in the art can appreciate a depositor's position is not the same as the borrower. Similarly because the art of depositing is different to loan application, there is no requirement for a loan authoriser in our claimed invention. The initiator of the network here invites members whom he or she knows of in good financial standing to participate in the deposit network as such there is no element of credit screening or application as such as teach by Zandi. As mentioned in our claimed invention, the members in a trusted network deposit auction are anonymous to each other but for the initiator therefore providing comfort to the other members that in the event of a default, the initiator has to bear the substantial responsibilities. As shown later, given that the pooled deposit arrangement is shared by networked members, the potential losses is further minimised in proportion to the said member's contribution. In Zandi there is no teaching of bidders co-sharing the deposit responsibilities and in fact there is only one lender or winner selected by borrower to bear the whole amount. In Zandi, the borrower is clearly identified at the outset of the auction and the borrower gets to pick the winning bidder. In our claimed invention, there are no borrowers at the outset of the auction but at the end of each auction session, one winner will be selected by the host system as the deposit taker or borrower based on the best offer rate being offered by said borrower/winner. Unlike Zandi where the winner is a selected lender, our claimed invention's auction process provides a winner in the form of a borrower. This means the depositor with the highest bid becomes the borrower but is not identifiable at the outset of the auction. Moreover each depositor will have the opportunity to be a borrower through further elimination of previous winners in subsequent auction sessions which distinguish Zandi where the borrower is fixed and the auction is only held once for borrower to select lenders. Finally, Zandi did not suggest loan auction in a trusted network whereby said membership is based on invitation and optionally a character screening process.

It is therefore an object of the present invention to provide a novel method, system, and computer program product for conducting an electronic pooled financial asset depositing auction wherein a prospective auction is held with anonymous members known only to the initiator and whereby membership is by invitation;

It is an another object of the present invention to provide a novel method, system, and computer program product to include financial assets such as shares or cash equivalent in such a deposit and as a return as subscribed by the selected winning bidder;

It is another object of the present invention to provide a novel method, system, and computer program product for a depositor to place one bid either in open or in secret against the pooled deposits within one session and where the selected winner is excluded from participating in subsequent sessions. The number of sessions is determined by the grouped members but in no event greater than the number of members. The period in a session can be a month, a year or whatever suitable time frame as determined by the initiator in agreement with the members.

It is another object of the present invention to provide a novel method, system, and computer program product to maximize the return based on the average of the returns from all the bided sessions with the last depositor achieving the best return.

It is another object of the present invention to provide a novel method, system, and computer program product to increase participation by providing a trusted link to network with another private network of anonymous members.

It is another object of the present invention to provide a novel method, system, and computer program product to provide members with an opportunity to borrow pooled funds between members of a trusted network anonymously where each member is given an opportunity to utilise the pooled funds at each session.

It is another object of the present invention to provide a novel method, system, and computer program product for soliciting competitive returns, without exposing their true identities or desired role as the borrower.

SUMMARY OF THE INVENTION

The trusted deposit auction starts with the initiator identifying members known to him or her to participate in a private peer to peer trusted network wherein said members are either known associates, friends or business partners. These members are invited to join said private network and a handle is provided to these members to protect their identities upon confirmation. Upon registration, confirmation and agreeing to the terms of the deposit auction, each member is invited to bid for the pooled deposit funds by submitting a bid. The best bid is identify as providing the highest return to the deposits provided by the other members. This bid-winner is then allowed to collect the pooled deposits at a discounted face value as channelled through the initiator by other members directly although a trust account may be employed for a fee. At the end of the deposit session or cycle, the winner bidder is requested to return the face value amount in accordance to the number of cycles the auctioning term is agreed upon. Say for example, if there are 9 members in a private network and the cycles/sessions are agreed to be 9 which means each members will have the opportunity to win, the first winner will return the face value of the principal contributed by each member at each cycle subsequent to the first cycle until one depositor is left or in the $9^{th}$ cycle. The payout is relative to the total amount the first winner has taken from the 8 members in the first cycle. The first winner is however excluded from bidding in the subsequent cycles and his role is limited to returning each principal portion of the pooled deposit only until the end.

In the preferred embodiment, the system comprises many networks of members who may have links with each other but without an invitation from said other networks may not be able to participate in the bidding for the pooled deposits offered by a particular network. Another non-obvious feature of this system is that the members of each network depositors who are declared winners are eliminated from future auction cycle which means only remaining depositors can bid. As this is a deposit network based on trust, it provides an alternative to better improved the return from said deposit based on a trusted network of friends.

In the event of a default, the member who recommended the member friend defaulted into the network should be made accountable to the losses. The system is designed for deposit terms and serve as an alternative investment vehicle between trusted members. The preferred embodiments below will best illustrate the claimed invention.

Andrew has some deposit where he wants to have a better return. He signup with the system and nominated a few of his friends. For example, he nominated May, Mary and Tim. Emails are sent to May, Mary and Tim requesting them to join this network setup by Andrew. In a single network system, this would be a completed network with Andrew as the initiator and May, Mary and Tim as members. Andrew set his terms of deposit with a deposit $1000 for 4 months with interest payable every month. May, Mary and Tim as members agreed to this term and the first deposit cycle is open for bidding. The terms of bidding is done in secret or open depending on the needs of the network. Obviously instead of cash, members may bid in securities or cash equivalent as the return. Members may offer cash equivalent as well as deposits. Bidding is done at the beginning of each cycle. In our example as can be seen in Table A, we assume 4 cycles with the various winners. In first cycle, the winner is May with bid at $300 which means May is willing to pay $ 300 as interest based on the principal of $ 1000. So in effect May will receive $700 from the other members and pay back $1000 at the end of the each subsequent cycle. At the end of the first cycle or beginning of the second cycle, another tender is open again amongst the same members except May is not allow to bid. Say this time Mary requires funds desperately and put in a bid of $ 300 and the other two put in bids lower such as $ 100 and $ 120. In this second round, Mary is declared the winner and each member provides $ 700 to Mary as deposit except for May which must provide $ 1000 from the $ 700 deposited with her earlier by Mary. This process is repeated until the fourth time which is the closing round where all the members' positions are squared. The table A below shows the cash position summary for each one of the members May, Mary, Andrew and Tim.

TABLE A

| Winner Cycle | 1 May | 2 Mary | 3 Andrew | 4 Tim |
|---|---|---|---|---|
| 1 | 2100 | −700 | −700 | −700 |
| 2 | −1000 | 2400 | −700 | −700 |
| 3 | −1000 | −1000 | 2950 | −950 |
| 4 | −1000 | −1000 | −1000 | 3000 |
| Net | −900 | −300 | 550 | 650 |
| ROI | −30% | −10% | 18.30% | 21.67% |

As can be seen May being the first winner has to pay the highest cost whereby she is given the privilege of receiving the deposit funds first. In this example, May bided $300 interest based on a face value of $1000. This means the other members will provide only $700 hence accumulated $2100 in cycle 1. May will receive the funds less the interest as shown in the row of the first cycle. In subsequent cycles, May has to pay back the face value of the deposit. The second session winner, Mary received the funds in the second cycle wherein she competes with Andrew and Tim only. She receives the principal face value from May and receives the discounted face value from Tim and Andrew. In the third round, there are only two bidders which are Tim and Andrew and Andrew being the winner in this round means he will receive the discounted face value from Tim while receiving his principal from May and Mary as seen in cycle/row 3. As can be seen, Tim being the final depositor managed to obtain the highest return. We use the handles May, Mary, Tim and Andrew to facilitate this example only. Other handles may be chosen by the members such as X122321 or BigTimer etc.

This method of seeking higher deposit rates means the payout depends on the member's requirements and bidding strategies. The winner from each cycle cannot bid again in the next cycle thus ensuring that members should best make use of the opportunity at hand. This also means members who are seeking higher returns should minimize the bid amount in order to be the last winner as the cycles progressed.

A deposit method based on trust is the essence of this system. As mentioned, the initiator of this network could act as a guarantor for the payout and rightly must be compensated for this risk by either receiving a fee or to be the last winner to ensure he or she gets the maximum return. This means the initiator could be someone with strong financial standing known to other members. The initiator must solicit other members and these members are not known to each other since their identities are protected by handles. Although in real life, they may even be colleagues or close friends or even husband and wife. Therefore, said members look towards the initiator as the manager of the private membership network and appropriately depends on his or her good judgement of the integrity of others in the network. For example, the first winner could have taken the pooled deposit in the first cycle and default the payments later. This would effectively end the auction for the other members to rightfully claim their deposit back even though this amount is a fraction of their full uncommitted deposits. Therefore, an initiator who has successfully arranged successful deposit auction network is highly sought after. In the claimed invention, a method to show the success rate of such initiator should be provided together with the aggregated amount deposited.

To build larger networks whereby one or two networks are linked together to get more members, it is essential to have at least members from other networks being recommended into the first network. In our example above, May who is a member of network 1 originally initiated by Tim has invited 3 more friends known to May but not to the other members in network 1. If these friends are not members of any network, then they are linked to network 1 as a sub network from May for example network 1A. May who is the initiator of network 1A will have to guarantee to network 1, the integrity of these members. For example, if any of these members participated in a deposit network bidding cycle and defaulted on the deposit payback commitment, then members in network 1 and network 1A will hold May as the guarantor as to their losses. Similarly, May will also receive some fees for bringing in this subnetwork 1A as exemplified by Tim as the initiator of network A.

Wherein the invitation is extended by May to a friend who also belongs to another network or subnetwork of another parent network the process is the same where the initialisation means May must known and able to vouch for the integrity of at least one of the members in the linked network. This process ensures anonymity to outside members of different networks until known members link one of their members into another network. For example, members within a network are anonymous to each other saved for the initiator who knows all their identities. Each member of a network is tied to the initiator and whereby the deposits are guaranteed by the initiator(s) when combined within different networks. The issue of anonymity is important as it protects the identities of the depositors and prevent other members from directly soliciting from said members. Similarly, it protects the identity of the borrower or would be borrower. By going directly to these members, the usefulness and trust placed on the initiator is diminished and hence the ability of the initiator to make fees from the arrangement. In practise, members are not interested to have their identities known beyond that of the initiator.

PROMINENT FEATURES OF THE INVENTION

A. Anonymity

Anonymity is preserved for all members except for the identity of the initiator who is known by all members. Given the sensitivity of depositor's financial status or that of the borrower, anonymity provides the best guarantee that in the absence of any credit check, the initiator provides such insurance.

B. Private Trusted Network Community

Allows members to create a personal and private networking community where members can network through members direct friends, friends of direct friends of members, and so on. Members can create a quick profile and add friends to their personal and private networking community. Then if those friends have other members in the system one can see these friends of their friends, and browse and search through all of the people connected to or through networks of friends. Members can view financial profiles, hobbies profile, books read, see how one is connected to other people, send messages, ask friends for introductions, or suggest originating a deposit auction between people. However when the actual auction is initiated, these members assume handles to protect their identities or potential roles either as a depositor or borrower. Members can also abstain from bidding in a particular auction but not in a session within the auction. The only way to 'abstain' in a session is to bid uncompetitively (say zero interest) so one avoid being the winner or the borrower. By doing so, this ensures being the last depositor in the auction and thus earning the highest return.

The system can be best sum as a trust network where individuals must have a trusted relationship with the initiator and where the roles of would be borrowers are competitively bided and are not distinguished at the outset. This means depositor has a conscious decision to make during each bidding session whether to continue as a depositor or a borrower. A desperate borrower may over bid and hence provide better returns to the other depositors. Therefore it is fair to say that the system exploits desperation rather than the real cost of money in the formal loan market. To maximise return, do not be borrower.

A third party operates the registration server system and bid analysis system, which registers bidders, accepts bids, and determines the winning bid on behalf of the initiator. Preferably this third party accepts a fee or charge a fee from the participants either as membership fee or transaction fee or in kind.

In accordance with the present invention, a system for conducting an electronic financial asset depositing auction comprises a client computer, a host computer and at least one computer network connected to said computers. The host computer performs the following functions: (1) making available a financial asset depositing invitation form over the World Wide Web to a prospective depositor over the computer network when the lenders/depositor's computer connects to its web site; (2) receiving from an initiator the email address of members he or she wish to invite and electronically forwarding the invitation form to the email addresses (3) receiving the financial asset depositing membership completed by the invited depositors over the computer network; (4) forwarding the completed application form to the initiator where the initiator will confirm membership; (5) receiving an electronic message from the initiator indicating whether or not the membership is approved and assigning a handle; (6) providing a record of the financial asset depositing membership to a database, if depositor is approved; and (7) informing the applicant about the membership approval.

In a preferred embodiment, the host computer is a computer server, and the computer network is the Internet. The server computer is connected, via the Internet, to at least a depositor computer wherein a number of depositor computers can be linked into a private network.

During the bidding process, the host computer will receive bids from members of the network only and decides who is the winner. The winner will be converted to one of a deposit taker or borrower. In short, the depositor who agrees to pay or offer the highest return is assumed to bid in view to be a borrower while the other depositors wanting to be depositors would bid the worst return to avoid the borrower's role. There can only be a deposit taker at each session and its determined by said session bidding process. If every depositor wants to be a depositor then there is no winner or deposit taker. This situation is highly unlikely since if the cost of funds is negligible there will be takers since one can borrow at negligible cost. In short, when no depositor wishes to provide a high return, this would benefit one wishing to borrow.

Once the winner is announced, the other members will forward the discounted principal value to the winner either by bank transfer or other means known in the fund transfer art. The system can accommodate this by setting up a trust or escrow account temporarily to collect the deposit funds before forwarding to the winner's designated account. The host computer then waits until the next auction session begins wherein the number of sessions is dependent on the number of members.

However the winners from each past sessions are excluded from subsequent auction cycles or sessions. The host computer will invite the remaining members to bid and decides on the winner. Once again, the winner will be announced and the other members will forward their discounted principal to the winner either via a trust account or escrow. This process is repeated until all the cycles have been completed and the deposit auction is declared closed.

In the preferred embodiment, the server computer further includes a World Wide Web site which provides information on the electronic person to person deposit auction process and a depositing program designed to take a prospective depositor step-by-step through the application and auctioning process. Such program will be in the form of providing a login and assigning a handle for the applicant to protect the true identity. Usually upon signing up subject to the initial invitation by the initiator, further information will be sought from the applicant including personal contact, bank account data and personal risk/return profile. An off-line verification process may be included such as sending confirmation letters to the applicant reachable at their stated address or providing a telephone call etc. An on-line verification procedure including digital certificates is also employed to check for any errors in the information provided or any other criteria as dictate by host authority from time to time. After it is approved, only the information agreed by both applicant/member and host authority will be provided for displayed to all bidders or depositors. Information which will be excluded are such as contact information and the real name of members. The depositor has the right to bid in any of the sessions or cycles as long as he or she has never been declared a winner or receive any of the pooled funds in the process. Information on the successful bidder may be made public.

The present invention provides a convenient way for a prospective depositor to seek better terms in accordance to his risk/return profile, share the risk of the deposit facility and to provide necessary funds in return for a competitive return within a trusted social grouping common to the initiator and to him or herself. The system is designed as an alternative to the formal depositing system.

Although not necessarily true, the initiator could be someone that they know personally and hence may share the same risk or return profile. In theory if the initiator is your friend then a friend of the initiator whom you may not know because the system is anonymous, may still be consider as reliable. It could be that this unknown member is within your circle of friends whom may be in financial difficulty and wish to borrow some funds in the short term anonymously. Usually friends may lend money to each other without expectation of being repaid or involving the legality of lending but our system provides a more professional and less troublesome way to cover such issues where relationship may be strained during the negotiating process. And more importantly the risk is then diversified between other members. Consider that when one placed deposits in a bank and the bank lends it to your friend again, it would be more affordable to use this system without having to pay a commission to the bank. One skilled in the art of lending may see that by incorporating lending measures such as collateral requirements, one can expand the system to not merely a deposit solicitation/auction vehicle but also a lending auction system. For example if we have 10 friends originating such a facility over a period of ten years with incremental capital being return in the facility then the pooled funds can be used for many on going financing requirements on demand for one session. The claimed invention is more efficient than the formal borrowing requirements at banks and less time consuming. This would suit small businessmen or associations of trade, clans members with limited capital to arrange financing amongst their network of friends where some of said friends may have access to funds as deposits and wish to see higher return in time of low interest rates as offered by banking institution. One of the unique feature of this claimed invention is the subtle social engineering approach which is used to identify social groups of similar financial or economic means in order to provide the same risk return profile as a first means to minimise default risk. In short, we assume that reasonable men and women would not want to tarnish their reputations by defaulting people that know or could vouch for them. Secondly, we assume people who are friends or known each other would share similar outlook in lives as well as acceptable behaviours. In short, one would not invite someone that you hardly know into the deposit auction session and have this person defaulting the group who happens to know you. We see this social network selection and by way of incorporating personality test as complementary to linear form of standard credit analysis. Therefore, we see such alternative depositing facility as satisfying the usefulness requirement in the practical world.

BRIEF DESCRIPTION OF THE DRAWINGS

These and other objects, features and advantages of the invention are more fully set forth in the accompanying Detailed Description in which:

FIG. 2 illustrates an application web-form for an initiator with partial filled data in accordance with the present invention.

FIG. 3 Is web-form of the status of a user in accordance with the present invention.

DETAILED DESCRIPTION OF THE INVENTION

The present invention provides system and method for conducting an electronic financial asset deposit auction. In accordance with the present invention, a prospective depositor, is more likely to discover a suitable match at more realistic terms and effectively than those he/she would have obtained by traditional ways. The system and method of the present invention offers to differentiate between a preference for risk or return for both depositors and borrowers. For example, there are individuals who prefer higher risk than available from standard banking depositing facilities or where the return is not closely correlated to cost of funds.

Figure 1:
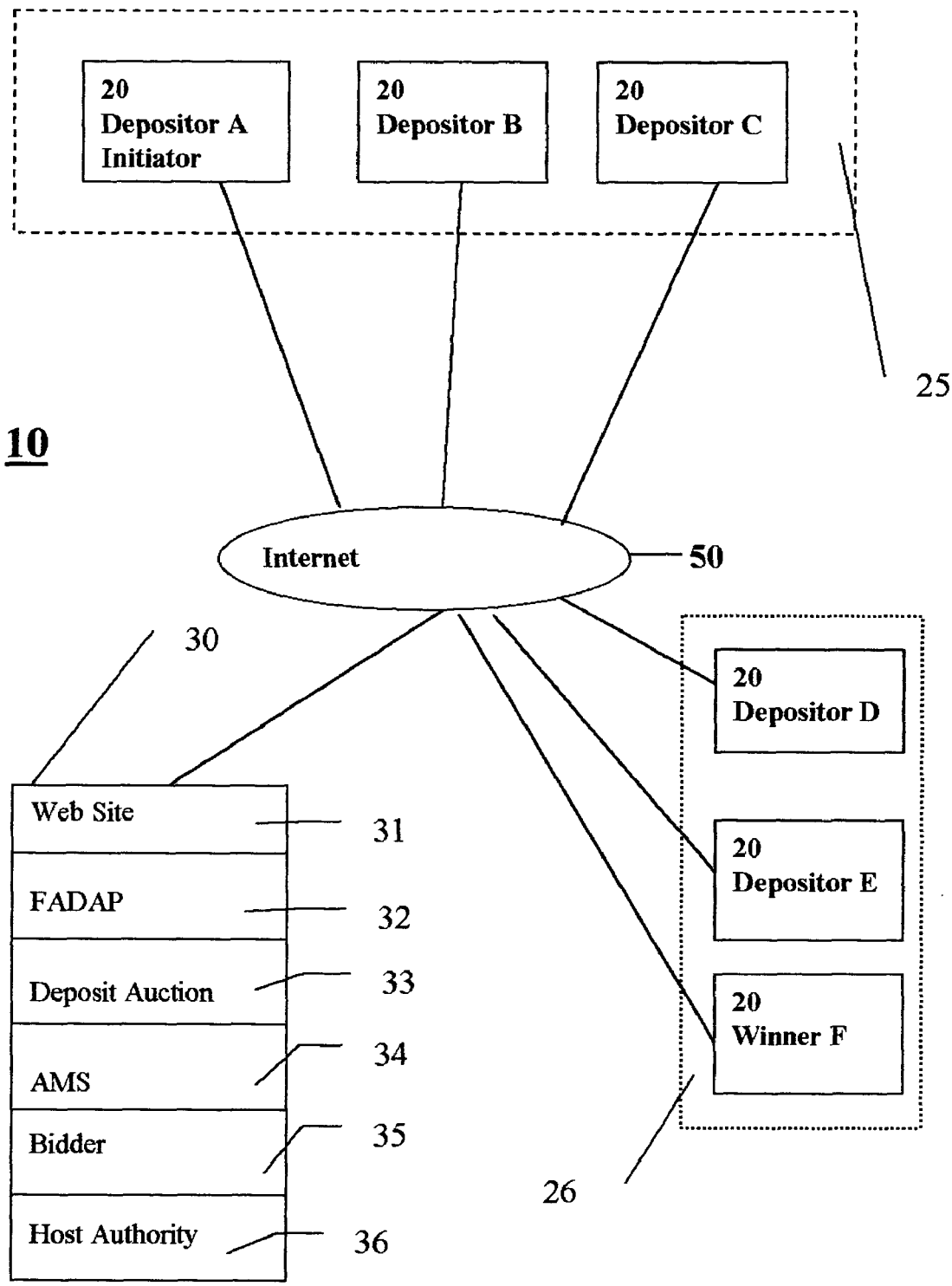
FIG. 1 illustrates a computer network system for conducting an electronic financial asset deposit auction in accordance with the present invention.

FIG. 1 is a block diagram of a computer network system 10 of the present invention. Computer system 10 comprises at least one client computer 20, preferably a computer workstation by a depositor. Computer 20 is connected to a host server computer 30 over at least one computer network 50. FIG. 1 also shows two trusted network 25 and 26 consisting of Depositors A, B, C in 25 and D, E, F in 26. The difference between network 25 and 26, is that in network 26, a deposit auction session has completed which shows Depositor F as the winner and hence Depositor D and E has to provide deposits to said F. In network 25, depositors A, B, C are members and can only have an auction amongst themselves. There is no winner as yet.

Computer 20 is a computer generally known in the field of computers. A host server computer 30 contains hardware and software adapted to communicate with other computers over a computer network and to make available computer files or software stored in the server computer or a storage device connected thereto such that they can be accessed by a person from another computer connected to the network.

Although one host computer server is adequate for the purpose of this invention, to achieve the benefit of redundancy, data security and distributed computing, more than one computer servers is preferred.

The trusted deposit auction computer system of the present invention operates as follows:

Computer 30 makes available a computer financial asset depositing application program (FADAP) 32 which is a client side program written in either PHP4 or Active Server Pages (ASP), which is accessible by a prospective depositor at depositor's computer 20 through computer network 50. FADAP 32 guides the depositor step-by-step to complete an electronic financial asset depositing application form contained in the FADAP 32 and sends it back to computer 30 via computer network 50. After receiving the completed electronic application, computer 30 reformats and checks the financial asset depositing application at the server side where it is reviewed by the initiator to see if the depositor is qualified. In this claimed invention the minimum qualification is an invitation by depositor "A" designated as the initiator. As mentioned, all membership or application can be initiated by an initiator. However, there is nothing to prevent a depositor to self-register first as initiator as can be seen in FIG. 2 (showing an application for an initiator) and subsequently inviting others as members of the network usually by emails or such as fax, letters, interactive voice response system (IVRS) etc may be used in lieu. For example to cater for senior users or those less exposed to the Internet age, the initiator can provide phone numbers to the system which will call the potential member using IVRS to facilitate the process in lieu of a terminal or simply by printing a letter which will be mailed to the invited party. This backward adoption of interfacing technology is to accommodate as many users as possible where senior users are more likely to be depositors rather than borrowers. One skilled in the art of invitation will be able to consider other methods to encourage as many users as possible known in the art.

Upon receiving an invitation email, the invited party can then click on the hyperlink in the email to reach Server 30. Usually the hyperlink will include some code recognised or generated at the time of invitation. The party may continue by filling up the web application form generated by FADAP 32. Upon acceptance by host authority 36, initiator is notified. In short, without an invitation one cannot join a network. To identify a peer computer, one may be asked to download an ID applet known in the art written in Java. Said member however as mentioned can start his or her own network and invite others. The initiator profile is available and exposed for each network as the contact point for each network. However to be an initiator, there must be members in the network and hence an initiator application will be pending until invited members are approved by host authority 36. Other rules such as choosing a new initiator may be incorporated for administratively running of the system such as permission settings, anonymity, permission to contact or send emails between members, min terms of deposits, minimum deposits, type of deposits, guarantee fee, social groupings like only women lawyers as members, friends for at least 5 years, ex-class mates from a school, commission rate, passing personality test etc. These are rules that govern the operation of the network where the initiator can set at the AMS 34.

Assuming Depositor A has been granted status as initiator by able to solicit depositor B and C to join network 25 as shown in FIG. 1. As mentioned only members of the same network can bid against each other. Hence Depositors D, E, F cannot bid in network 25. To link two trusted network together, for example, in FIG. 1, certain conditions must be satisfied such as Depositor E is known to Depositor A or vice-versa and hence either one party can initiate a proposal to link two network together and enlarge it to a single network combining 6 members. In this case, appropriate rules may be in place where say all members must agree to the merge or linking or at least 50% of the members from both network or that the linker has to guarantee the depositing performance of the linked members. The advantage of more members is the volume of funds being increased in proportion to the number of members. Obviously the track record of each network will be a determining factor, an inactive network would not see much interest from others. Furthermore, a network of criminal lawyers depositors may not want to link with a network of religious group. However, a network of female doctors may wish to link to a network of male dentists given the small gap in the groups' financial standing. In particular, a group which is used to providing deposits in amounts of $100,000 per session would not see any benefit in linking with a group that provides deposits of $100 per session per member.

To minimize server's processing power some information may be checked for accuracy at the client side using Javascript before it is being submitted. These will be minor inputs such as dates, null, postal codes, spelling and so on well known in the art of programming. FADAP 32 also provides for the depositor to adopt a handle or code name to protect the true identity of the depositor when displaying the information later. The actual assignment, confirmation and administration of these handles are done by the AMS 34. Personal information such as contact, real name will be hidden and will only be known by the submitter or by invitor. In addition, a special account will be set up for the submitter which is protected by a password and user's login to ensure that no one can tamper with the data. Said data may be bank accounts where money is channelled or deposited and hence a highly secure environment is required.

The actual auction process begins when the initiator after setting the terms of deposit invites the other members to participate. This can be done by sending an instruction to the host authority over the internet 50. The deposit auction program 33 then takes over by notifying the other members of the pending auction say starting in 24 hours and open for 24 hours. Each member after receiving notification can then login to their respective accounts to bid the return amount they are willing to provide as the deposits. Say the principal amount at each session is 100,000, the members can placed a bid of 30,000 which indicates the amount of interest payable. Preferably, the members will first indicate their willingness to bid to the DA 33. Knowing the number of members will then determined the number of sessions. Conversely where the principal amount is nominated as shares, then members can provide shares in return. Say the principal amount is 100 IBM shares, members can bid 20 IBM shares as return hence providing only 80 IBM shares as deposit. A combination of shares or cash equivalent such as bonds or in combination may be included to induce further creativity and flexibility to the system. Otherwise, another method is to provide the amount they wish to deposit directly say, instead of submitting 30,000, the member can placed a bid of depositing a sum of 70,000 which indicates he wants a return of 100,000 at the end of the period. Whichever method must be explained clearly at the outset of the auction and this is set by the initiator. Whichever method is matter of preference and not critical to the auction system. Some people may be comfortable by citing the actual return wanted and provide the principal less the bided return or some may be comfortable by indicating the deposit amount as a discount.

The host Authority 36 will decide on the best bid and will notify all the members in the trusted network of its decision. This is achieved by merely selecting the best bid. The winner's bid will be announced to all members so that the discounted principal can be forwarded to a trust account or to the initiator or directly to the winner whichever is best. The first session in the deposit auction ends. All records, created by the system is stored in the database as records comprising the winner, the bid, amount transferred and received, repayment such as shown in previously Table A individualised for each member. At any time, a depositor may download a status report of auctions including bids submitted for his/her application onto his/her computer 20 via computer network 50.

The method and system for conducting an electronic financial asset deposit auction of the present invention will now be described in detail.

FIG. 1 depicts a preferred embodiment of a computer system 10 for conducting an electronic financial asset deposit auction of the present invention. Computer network system 10 comprises a general purpose computer 30 as a server connected to computer network 50. Preferably, server computer 30 is a computer workstation, and computer network 50 is the Internet. More preferably, server computer 30 is connected to the Internet 50 via the fastest available connections.

Server computer 30 includes: (1) a World Wide Web site 31 such as www.depositauction.com including the FADAP 32; (2) a computer software 33, designated herein as DepositAuction., for managing the electronic financial asset depositing auction; (3) a computer software 34 called Auction Management Systems or AMS (4) Bidder program 35 a program to bid with and (5) Approving/Host Authority 36 a program that checks whether all criteria are meet before accepting the application including selecting winners and preventing past winners from participating again. They are described in more detail below. All programs are accessible via their respective clients and are managed at the server side.

A. The Web Site

In the preferred embodiment, Web site 31 provides the following information or applications:

(1) A summary of current eligibility status;

(2) Description of the types of bids available via the computer financial asset depositing auction system such as interest rates, shares etc;

(3) Description of the organization operating the website, designated herein as www.depositauction.com., that runs the electronic financial asset depositing auction and list of benefits and costs for using the auction system;

(4) Description of required legal disclosure for using the financial asset depositing system;

(5) Pre-qualification application, online personality, IQ or EQ test, login and handle assignment forms;

(6) Forms for Personal facts, contacts, questions and answer;
(7) Question and answer chat section;
(8) Financial asset depositing application program (FADAP) 32;
(9) Bidder program (BP) 35
(10) Technical support for FADAP and the BP; and
(11) Advertiser billboard.

B. Financial Asset Depositing Application Program ("FADAP") 32

Designed to be directly assessable by a prospective depositor from the Web site to his/her own computer, FADAP is to be used by the prospective depositor only. A FADAP created form can be seen in FIG. 2.

C. DepositAuction 33

Residing on server computer 30, DepositAuction 33 is a client/server database application which is used to manage the electronic auction. It ensures the bids are registered from the members within the same network and collate them for host authority 36 to select the winner. It also checks if submitters have not been excluded by verifying their status either as depositors or winners from previous sessions. Only depositors not previously declared as winners can submit. It also displayed all the bids for members within the same network at the end. In general this is the front end of the system for interacting with the depositors.

D. Auction Management System 34

Auction management system (AMS) is a client/server application residing on server computer 30 and in general serves as the backend of the system. It operates to manage the database, active depositor applications, current status of applications and all transaction including accounting functions such as crediting and debiting the deposits records. It also operates to enter depositor's bid into DepositAuction 33 and when the winner is selected by host authority, the result will be transmitted to AMS for record. AMS 34 is designed to be all purpose and can be adapted for as many administrative functions as possible. If on-line personality tests are provided by the system service provider, AMS will be used to administer them and record the results to initiator. As mentioned, said tests are merely screening tools in addition to the invitation. Such tests are optional, given that not every member are willing to take IQ or EQ tests even though they may be free and as some consider harmless. Nevertheless other lighter tests may be used or ethics test as pre-screener. Members of professional groups are easy to screen as they have membership numbers, which can be checked online. However, the important feature is still one of invitation to membership first.

When host authority 36 declares a winning bid, DepositAuction 33 notifies AMS 34 and AMS 34 sends messages to the successful depositor and the unsuccessful depositors. Host Authority 36 then collects the deposits from the unsuccessful bidders and transfer them to an escrow account to be drawn by the successful bidder. AMS 34 marks said winner as no longer eligible to bid in subsequent sessions until the whole auction is closed. AMS updates this information for each session.

E. Bidder Program (BP) 35

Preferably, each of depositors' computers 20 has accessed to Bidder 35 which is a client/server application which resides at Server 30, herein designated as Bidder 35, for use by the depositors to participate in the electronic auction. The Bidder works to capture bid data submitted by the depositors being networked to Computer 30 via a webpage. In sum, the Bidder Program 35 is used by a prospective depositor to prepare and to submit a bid.

F. Host Authority 36

This is a rule based software setup to manage the various other software in the system. The software allows the system administrators to set rules for Initiators to access the system as well as for Initiators to provide individual rules being used for the auction process, membership process, screening process and the deposit return, reward/fee structures.

In FIG. 2, we have a webpage form created by activating FADAP. In Box 40, we have the filled personal data of the applicant which in this case have chosen the handle Cute Girl. In Box 42, Cute Girl has provided details for the network which is aimed to seen by others and to pending members. In Box 41, "Cute girl" has invited potential members by inserting their email addresses, which will be sent later. To qualify as an initiator, there must be at least 2 or more confirmed members. This webpage form can also be used by invited members wherein the box invited as shown in FIG. 2 by must be filed by the invitee. The invitee may also fill the Box 42 which will be seen by other members in the same network. For members, one can fill this with depositing requirements or even with detail on the member relationship with the initiator. For example, I have known Cute Girl or Mary for 10 years since high school etc. While anonymity is a key feature of the system, members who wish to remove such anonymity may do so by declaring their identities here in the Your Comments section. As usual the Box 40 will be filled by the invitee with their own data before submission. This member application form (other than initiator) will be forwarded to Initiator for endorsement once the usual checks as prescribed by initiator have been done by Host Authority 36. Such checks usually administrative based on rules such as minimum Average DEP entered, occupation etc. This check requirement is not compulsory but for security at the very minimum verification of the invitee's identity based on credit card details or bank details should be applied consistently. This could be carry out by sending a request to charge the card with a random amount and asking the invitee to input the random amount charge as an indication that the invitee has accessed to the submitted account. If the random amount input matched the random amount charged, this will prove authentication of identity. This ends the membership to the trusted network section of the system. Other methods to secure the identity and integrity of members may be used. For example, an unscrupulous initiator may install fictitious members in a bid to attract genuine members to deposit with the network in order to defraud them. Therefore, it is important for potential members to be careful of unsolicited invitation by persons that they have limited relationships with. In theory a syndicate can set up a bogus network of 10000 members with each willing to deposit 100 making each pooled funds at each bidding session at 1 million in principal. In short, a user willing to deposit a principal of 100 may access the pooled funds by bidding wishful returns and disappears later without further deposits. Therefore, perhaps a range of sensible returns should be set to ensure realistic returns say within 10-30% max. As usual the host system will attempt to verify members details including fictional ones to reduce fraud at the outset and periodically at a random basis.

In FIG. 3 which shows a webpage in regards to the status of each member of a network, in this case Cute Girl. This webpage is generated by AMS 34 when a member login into the system and identifies the user by the handle's name at the top and the status as well as the name of the network and the date of starting the network. Being an initiator, Cute Girl may delete a member. All members can invite new members to the network "WomenLawyer". In the same page, it details the most current membership in the network and provides details of the members if they belong to any network within the system for example Gjkhkhk@cc.com is identified to belong to another network. It is common for a member to be active in more than one network wherein the status may be an initiator or member only. However in order to link to another network, only a common member may initiate such link as explained previously. In the cash flow box, we can see a summary of the current auction. If there are a few, then they should be included in this page. The cash flow shows a payin of 50 to mean as initiator, Cute Girl has received a fee of 50 as commission while she has pay out to winner XXX@gbds.com the amount 86,000 (discounted principal based on 100,000 with inherent 14,000 as interest amt bid). This example status page is not limiting and is designed to show the minimum information and one skilled in the art will be able to incorporate other useful information for example a link to update profile, messaging facilities and so on. After all the system is designed to build communities with a view of benefiting their overall financial positions and therefore, a system that enhances communication or interaction such as including success stories, a message board are likely to be included.

Figure 4:
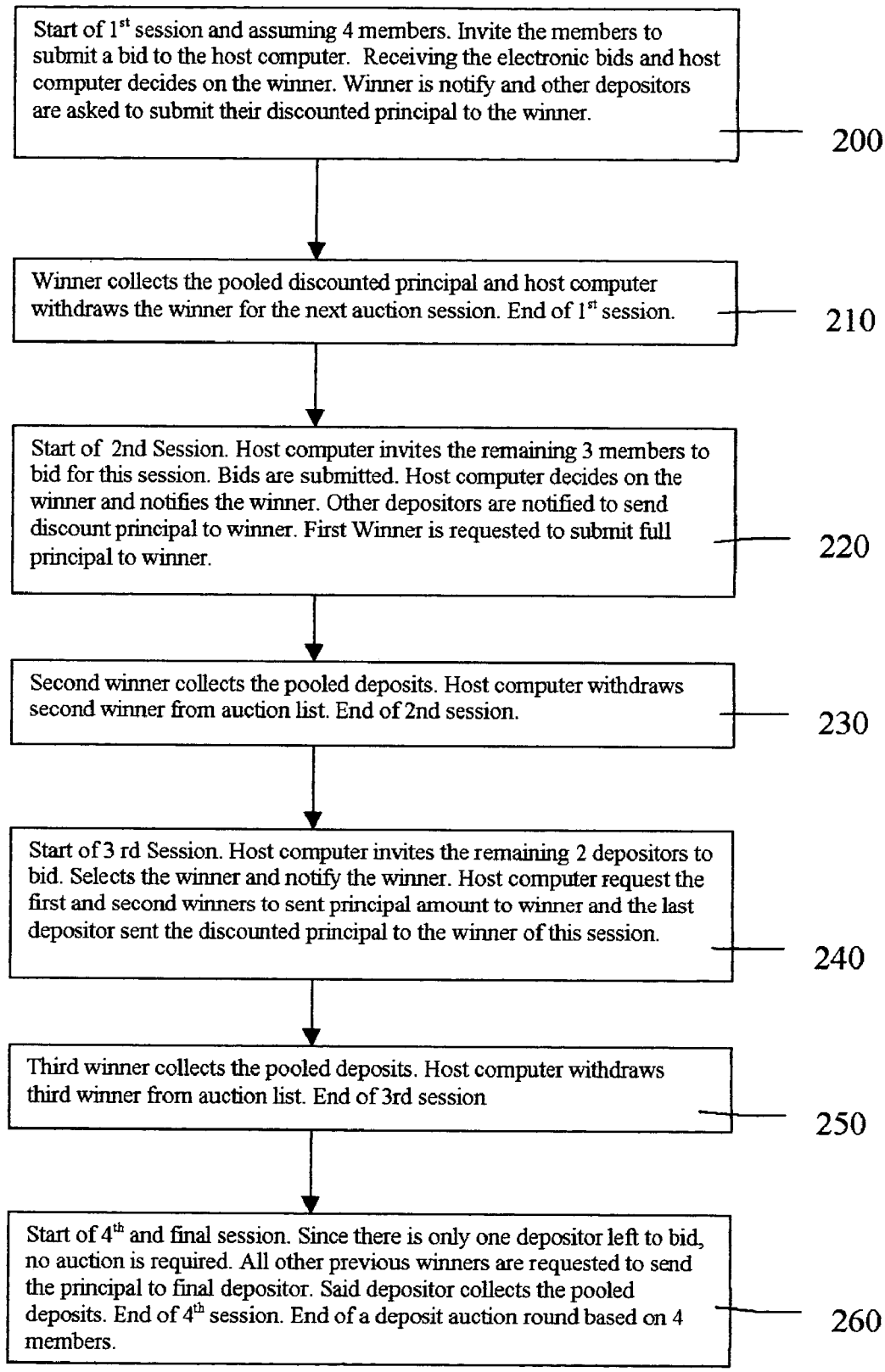
FIG. 4. Is a flow chart for the entire auction sessions assuming 4 members in a private network.

In FIG. 4, we have the flow chart for an auction process, starting with box 200 whereby session one has been completed with the submission of bids by invited members of the network. A period or interval of a few days to a few months can fix each session. The host computer 30 then selects the winner and notifies all the members to submit the amount or approve the transfer of funds.

In box 210, once the funds have been submitted to an escrow account they are then pooled and forwarded to Winner's account. The computer 30 will then withdraws the winner from further auction participation. Session one is ended.

In box 220, we assume session two is starting. As mentioned, by default the sessions are defined in accordance to the number of members so to give each member a chance the role of deposit taker or winner. However, this is not a strict rule and depends on the members arrangements. In session two, only 3 members are left to bid and similarly the bids are collected by host computer 30 for selecting the winner. Notification is sent out and funds transferred to escrow or directly to the winner's account. The exception here is that the first winner in the first session has to submit the deposit as well in full principal amount to the second winner or to an escrow account wherein the principal is paid to the second winner. This means the first repayment of the deposit is made here in the second session. In box 230, the second winner collects the pooled funds including the principal from first winner and host computer withdraws the second winner from participation in future auctions. Thus session two is ended. In Box 240, session 3 begins with the two remaining members. Again after the bids are submitted, the host computer 30 decides on the winner and notifies the others to submit funds to the winner. The previous two winners now have to provide repayment to this winner of the full principal to third winner. In short, winner one will be repaying the second principal while winner two will be repaying the first principal and the loser in this session will be forwarding the discounted principal. In Box 250, the third winner collects the pooled deposits and host computer withdraws said winner from the last auction. The third session has ended. In Box 260, the final session begins and since there is no other members left to bid, the last depositor will receive all the principals from the winners from the previous sessions. When this session ends, this signals the deposit auction has completed a full cycle and is closed. Each auction session is marked as an interval such as 1 month, 2 months or 90 days or 1 year etc fixed by the initiator and agreed by the members. The net of this deposit auction shows that the 'loser' ie the depositor who has not win a session to have the highest return from his/her deposits.

For simplicity, a netflow box B is detailed below to reflect the cash position. We assume the principal to be 1000. May is the first winner, Mary is the second winner, Andrew is the third winner. Negative sign means outflow of funds and a negative ROI shows the return/cost on investment. One can see that while May and Mary bided the same rate ie 300, their costs are different since Mary only receive the funds in the second session and hence have a shorter period of usage.

| | NetFlow Box B | | | |
|---|---|---|---|---|
| Cycle | 1<br>May | 2<br>Mary | 3<br>Andrew | 4<br>Tim |
| 1 | 2100 | −700 | −700 | −700 |
| 2 | −1000 | 2400 | −700 | −700 |
| 3 | −1000 | −1000 | 2950 | −950 |
| 4 | −1000 | −1000 | −1000 | 3000 |
| Net | −900 | −300 | 550 | 650 |
| ROI | −30% | −10% | 18.30% | 21.67% |

Figure 5:
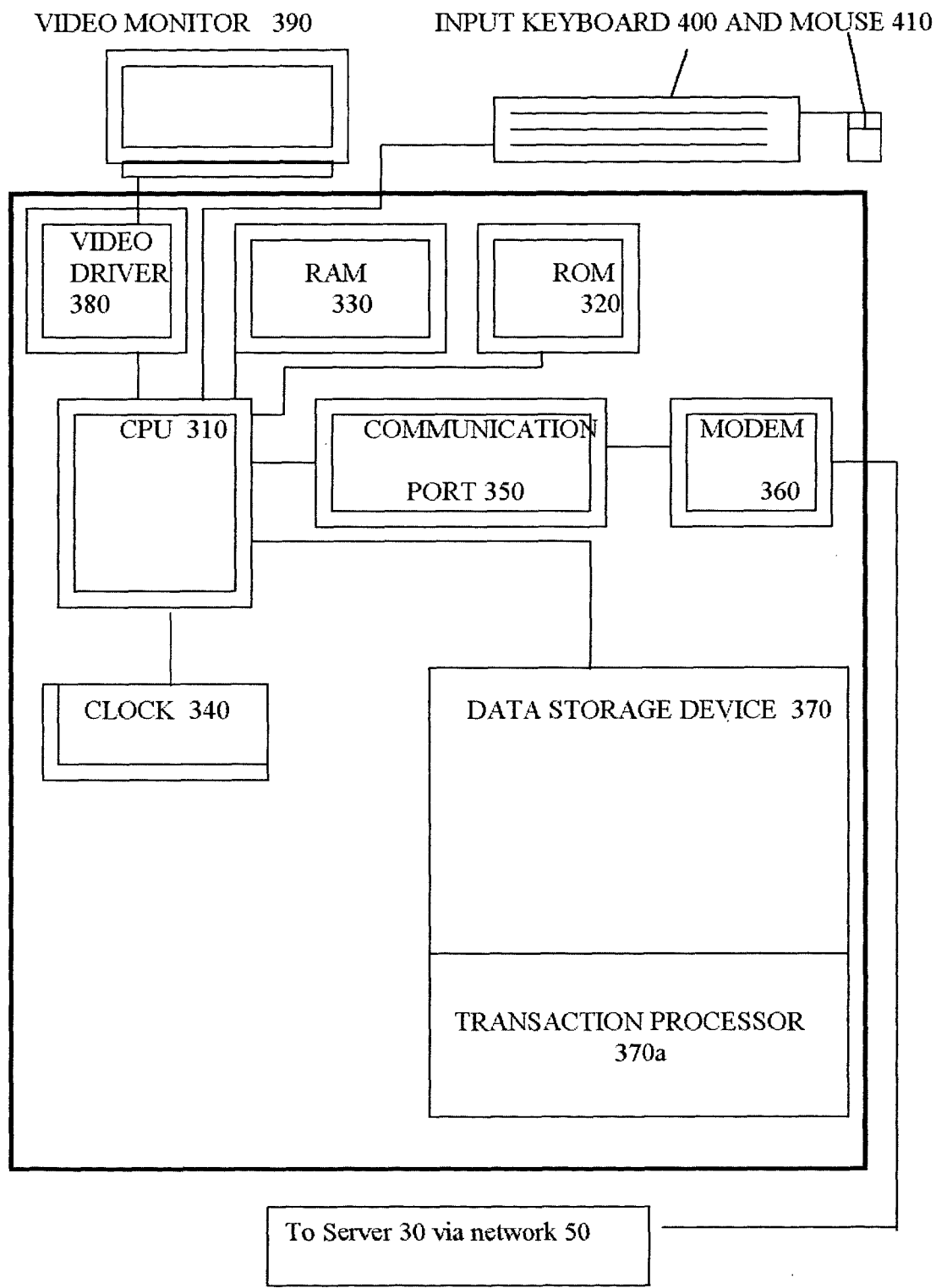
FIG. 5. Is a block diagram of a preferred computer.

In FIG. 5, we have a general block diagram of a computer 20/30 known in the art. As discussed there can be a number of client terminals 20 linked to the one or more server or central controller 30. Terminal 20 includes a CPU 310, ROM 320, RAM 330 and a clock circuit 340. The terminal 20 also includes a communication port which interfaces with a modem 360 that facilitates communication between the client terminal 20 and the central controller 30. Of course instead of a modem 360 other communication devices can be used as shown above for the central controller 20.

The client terminal 20 also includes an input device 400 to receive input from an operator or user. Any of a wide variety of input devices would be suitable including touch screen, mouse 410, keyboard 400. The input device 400 may interface directly with the CPU 310 as shown in the figure. Alternatively an appropriate interface circuit may be placed between the CPU 310 and the input device 400.

The client terminal 20 also includes a video monitor 390 for conveying information to the operator. While the most preferred video monitor 390 is a CRT, other video display devices including LCD, LED and thin film transistor panels, may be used as well. A video driver 380 interfaces the CPU 310 to the video monitor 390 (or to any other type of video display device). The terminal 10 also includes a data storage device 370 in which transaction processor instructions 370a are stored. These instructions can be read by and executed by the CPU 310 thereby enabling the CPU 310 to process transactions. Typically the client terminal 10 will run a browser type of software which enables it to access information via the Internet 50 and onwards to the central controller 30.

A client terminal 20 is a personal computer, notebook computer, Internet appliance or pervasive computing device (e.g., a PDA or palm computer) that is PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications.

The claims which follow are to be interpreted to cover all of the equivalent structures and methods. The inventions, thus, not to be limited by the above exemplary disclosure, but only by the following claims. While the present invention has been described above in terms of specific embodiments, it is to be understood that the invention is not limited to the disclosed embodiments. On the contrary, the present invention is intended for various modifications and equivalent structures included within the spirit and scope of the appended claims.

I, the inventor claims:

1. A method for conducting a trusted deposit auction within at least one network connected to at least one depositor's computer comprising:
providing a host server connected to the network that performing steps comprising;
A) receiving bid amount as a discount from principal or discounted principal from depositors;
B) selecting a winner from said bids in said auction submitted by said depositors;
C) excluding said winner from future auctions;
D) depositing pooled funds for said winner's account;
E) repeating steps A, B, C, D at predetermined intervals with remaining depositors and whereby said host server maximizes return on deposit for at least one depositor.

2. The method of claim 1 wherein pooled funds include funds from each selected winner making principal repayment at each predetermined interval beginning from next interval following their respective winning interval.

3. The method of claim 1 wherein pooled funds include a discounted principal from each remaining depositor not selected as winner at each predetermined interval, said discounted principal is based on discount equivalent to the bid amount submitted by selected winner.

4. The method of claim 1 whereby membership of a depositor to said network is by invitation only and anonymous.

5. The method of claim 1 whereby said networks are linked for deposit auction by invitation from at least one member of one network having relationship with at least one member of a target network.

6. The method of claim 1 whereby said step of repeating at step E is executed until one depositor is remaining or for a fixed number of sessions as agreed at outset of the auction whereby said number of sessions is no greater than number of depositors at outset.

7. A trusted deposit auction system comprising:
at least a network consisting of depositors' computers;
a host server connected to the network for deposit auction; wherein said host server further comprising:
a memory having at least one region for storing executable program code; and a processor to execute the program code stored in the memory, wherein the program code, further comprising:
A) code to receive bid amount as a discount from principal or discounted principal from depositors;
B) code to select a winner from said bids in said auction submitted by said depositors;
C) code to exclude said winner from future auctions;
D) code to deposit pooled funds for said winner's account;
E) code to repeat execution of codes A, B, C, D at predetermined intervals with remaining depositors; and
whereby said host server maximizes return on deposit for at least one depositor.

8. The system of claim 7 wherein pooled funds include funds from each selected winner making principal repayment at each predetermined interval beginning from next interval following their respective winning interval.

9. The system of claim 7 wherein pooled funds include a discounted principal from each remaining depositor not selected as winner at each predetermined interval, said discounted principal is based on discount the bid amount submitted by selected winner.

10. The system of claim 7 whereby membership of a depositor to said network is by invitation only and anonymous.

11. The system of claim 7 whereby said networks are linked for deposit auction by invitation from at least one member of one network having relationship with at least one member of a target network.

12. The system of claim 7 whereby said code E is executed until one depositor is remaining or for a fixed number of sessions as agreed at outset of the auction whereby said number of sessions is no greater than number of depositors at outset.

13. Computer executable software code stored on a computer readable storage medium implementing the method of claim 1.

14. Computer executable software code stored on a computer readable storage medium implementing the method of claim 2.

15. Computer executable software code stored on a computer readable storage medium implementing the method of claim 3.

16. Computer executable software code stored on a computer readable storage medium implementing the method of claim 4.

17. Computer executable software code stored on a computer readable storage medium implementing the method of claim 5.

18. Computer executable software code stored on a computer readable storage medium implementing the method of claim 6.

19. A trusted deposit auction system including a computer connected to a network programmed to perform the method of claim 1.

20. A trusted deposit auction system including a computer connected to a network programmed to perform the method of claim 6.

* * * * *